United States Patent
Beekmann et al.

(10) Patent No.: US 11,527,893 B2
(45) Date of Patent: Dec. 13, 2022

(54) METHOD FOR SUPPORTING AN ELECTRICAL SUPPLY GRID BY MEANS OF ONE OR MORE WIND TURBINES

(71) Applicant: Wobben Properties GmbH, Aurich (DE)

(72) Inventors: Alfred Beekmann, Wiesmoor (DE); Marcel Kruse, Beverstedt (DE)

(73) Assignee: Wobben Properties GmbH, Aurich (DE)

( * ) Notice: Subject to any disclaimer, the term of this patent is extended or adjusted under 35 U.S.C. 154(b) by 246 days.

(21) Appl. No.: 16/956,982

(22) PCT Filed: Dec. 20, 2018

(86) PCT No.: PCT/EP2018/086383
§ 371 (c)(1),
(2) Date: Jun. 22, 2020

(87) PCT Pub. No.: WO2019/122233
PCT Pub. Date: Jun. 27, 2019

(65) Prior Publication Data
US 2020/0392944 A1    Dec. 17, 2020

(30) Foreign Application Priority Data
Dec. 22, 2017  (DE) ................. 10 2017 131 056.8

(51) Int. Cl.
*H02J 3/38*    (2006.01)
*H02J 13/00*   (2006.01)
(Continued)

(52) U.S. Cl.
CPC ............ *H02J 3/381* (2013.01); *F03D 7/0276* (2013.01); *F03D 7/0284* (2013.01); *F03D 7/048* (2013.01);
(Continued)

(58) Field of Classification Search
CPC ..................................................... F03D 7/0284
(Continued)

(56) References Cited

U.S. PATENT DOCUMENTS 7,839,024 B2 * 11/2010 Cardinal ................. F03D 7/047
                                                         307/47
8,972,521 B2    3/2015 Fritsche
(Continued)

FOREIGN PATENT DOCUMENTS

| AT | 14014 U1 | 2/2015 |
| DE | 102011081446 A1 | 2/2013 |
| DE | 102015000282 A1 | 7/2016 |

(Continued)

*Primary Examiner* — Joseph Chang
(74) *Attorney, Agent, or Firm* — Seed IP Law Group LLP (57) ABSTRACT

A method for assisting control of an electrical supply grid) or a portion thereof is provided. The method includes recording system states of the grid and/or influencing the grid, transmitting the states to a central evaluation and/or control unit and/or between other subscribers, including wind turbines and/or wind farms that supply the grid, for use in controlling their supply to the grid. The method includes controlling the grid on the basis of the transmitted states. Fundamentally identical states are simultaneously recorded at multiple recording locations associated with the grid and the recording of at least one of the states at a respective recording location is performed by a turbine and/or farm and the turbine or farm recording a state at one recording location and the turbine or farm recording a state at another recording location are independent at least such that they supply to the grid at different points.

19 Claims, 3 Drawing Sheets

(51) Int. Cl.
  *F03D 7/02* (2006.01)
  *F03D 7/04* (2006.01)
  *H02J 3/46* (2006.01)
  *H02J 3/50* (2006.01)
  *H02J 3/48* (2006.01)

(52) U.S. Cl.
  CPC .................. *H02J 3/46* (2013.01); *H02J 3/50* (2013.01); *H02J 13/00006* (2020.01); *H02J 13/00017* (2020.01); *H02J 3/48* (2013.01); *H02J 2300/28* (2020.01)

(58) Field of Classification Search
  USPC ........................................................ 307/153
  See application file for complete search history.

(56) References Cited

U.S. PATENT DOCUMENTS

| | | |
|---|---|---|
| 2011/0004356 A1* | 1/2011 | Garcia .................... F03D 7/048 700/287 |
| 2011/0166717 A1 | 7/2011 | Yasugi |
| 2014/0225446 A1 | 8/2014 | Giertz |
| 2018/0219376 A1 | 8/2018 | Strafiel et al. |
| 2020/0003181 A1 | 1/2020 | Brombach et al. |
| 2020/0095981 A1* | 3/2020 | De Boer ............... F03D 7/0268 |

FOREIGN PATENT DOCUMENTS

| | | |
|---|---|---|
| DE | 102015112155 A1 | 1/2017 |
| DE | 102016123384 A1 | 6/2018 |
| EP | 2393248 A1 | 12/2011 |
| WO | 2014165366 A1 | 10/2014 |

* cited by examiner

METHOD FOR SUPPORTING AN ELECTRICAL SUPPLY GRID BY MEANS OF ONE OR MORE WIND TURBINES

BACKGROUND

Technical Field

The present invention concerns a method for supporting an electrical supply grid, or a portion thereof. Additionally, the present invention concerns a supply arrangement having multiple wind turbines, in particular for carrying out a method for supporting an electrical supply grid. The present invention also concerns a wind turbine and it also concerns a wind farm having multiple wind turbines.

Description of the Related Art

It is known practice to use wind turbines and wind farms, which have multiple wind turbines, to supply to an electrical supply grid. An electrical supply grid of this kind can be the European grid system, for example. It may also frequently be adequate or expedient to consider only a portion of an electrical supply grid of this kind. By way of example, many European countries participate in the European grid system, and, within the countries, supervision of individual network sections by different network operators is also within the bounds of possibility.

It is fundamentally also known practice for wind turbines and especially wind farms also to be able to support an electrical supply grid when supplying thereto. In this regard, particularly behaviors prescribed on the basis of frequency and/or voltage are within the bounds of possibility. An example of support for the electrical supply grid is also that such wind turbines can continue to be operated through brief faults in the electrical supply grid and can therefore continue to supply particularly after such troubleshooting.

Such support measures are therefore only reactions to a behavior of the electrical supply grid. A further improvement could involve the wind turbines also being able to form active support proactively. Proposals have already been made in this regard to the effect that network operators controlling the electrical supply grid or a portion thereof control wind turbines or wind farms directly, or at least prescribe setpoint values for them.

In this case, the wind turbines or wind farms operate as controllers of the network operator.

It should be mentioned, however, that wind turbines today are highly complex generating units that provide a wide variety of control options and, to that end, also have many sensors in order to be able to perform such control. At least some of the aforementioned methods do not exploit the potential of possible complex and sensitive feedback control by wind turbines or wind farms.

The German Patent and Trademark Office searched for the following prior art in the priority application pertaining to the present application: DE 10 2011 081 446 A1, AT 014 014 U1, DE 10 2015 000 282 A1 and DE 10 2016 123 384 A1.

BRIEF SUMMARY

Supporting the control of the electrical supply grid and exploiting special features of the wind turbines or wind farms are provided herein.

A method is provided. This method is envisaged as supporting an electrical supply grid or a portion thereof. It first of all proposes recording system states of the electrical supply grid and additionally or alternatively system states influencing the supply grid. System states of the electrical supply grid are particularly voltage based on magnitude, frequency and phase, or variations in these quantities. Other voltage properties such as a harmonic content or transient processes also come into consideration, however. Particularly frequency can also be considered as a separate quantity, this usually being captured via the voltage, because it is the frequency of the voltage.

Possible system states influencing the supply grid are in particular environmental conditions, which can influence the electrical supply grid particularly via wind turbines supplying to the electrical supply grid. By way of example, the supply of electric power by wind turbines is dependent on the available wind, and therefore the available wind, particularly the prevailing wind speed, is a system state that influences the electrical supply grid. Such a system state influencing the network can influence not only a wind turbine or a wind farm in which said status has been captured, but also wind turbines or wind farms in the vicinity. If appropriate, this also allows a prediction to be made for other wind turbines or wind farms.

Other system states influencing the supply grid can also be system states of wind turbines, for example, such as, for example, their present rotation speed, however. A present rotation speed can, if necessary, be used to derive an available instantaneous reserve contained in the flywheel mass of the relevant wind turbine. An instantaneous reserve of this kind, as such, can also be a system state that influences the supply grid.

It is now also proposed that system states recorded in this manner be transmitted to a central evaluation and/or control unit (central wind farms controller and/or central controller). Additionally or alternatively, it is proposed that such system states be transmitted between generating units, in particular between wind turbines and/or wind farms, that supply to the same electrical supply grid. Such generating units can also be referred to as subscribers for simplicity below. Such transmission is particularly proposed for use by the generating units for the purpose of controlling their supply to the electrical supply grid. The generating units, in particular wind turbines and wind farms, can therefore supply to the electrical supply grid with better coordination.

Furthermore, it is proposed that the electrical supply grid be controlled on the basis of the transmitted system states. The system states that have been recorded are thus not only used in this instance to control the respective installation that has recorded them, but rather are also provided as general information in this instance. This allows a large amount of information to be used and hence control of the electrical supply grid to be improved, or at least put on an improved basis, by virtue of this information, which is often available anyway, being transmitted to the central wind farms controller and/or central controller so as thereby to provide it to others. In this regard, it is also within the bounds of possibility for the system states to be transmitted between other subscribers, in particular generating units, in particular wind turbines and/or wind farms. This also allows such information to be distributed as broadly as possible.

It is then proposed that the electrical supply grid be controlled on the basis of the transmitted system states. Such control of the electrical supply grid can concern direct control, in particular by a network operator of the relevant electrical supply grid. Alternatively, it can mean prescribing setpoint values or previously stipulated characteristics that are to be used for control. Direct control on the basis of the transmitted system states is also within the bounds of possibility. This can mean a voltage-dependent supply of reactive power or frequency-dependent supply of real power, for example, the respective assumed voltage or frequency of the two cited examples being able to form a transmitted system state in each case. There is then thus no locally limited control on the basis of a locally recorded system state or locally recorded multiple system states, but rather the transmitted system states are used, which are thus recorded in distributed fashion. In particular, coordinated control of the electrical supply grid is therefore effected on the basis of the transmitted system states by virtue of the transmitted system states forming a basis for coordinated control of this kind.

It is now also proposed that fundamentally identical system states be simultaneously recorded each time at multiple recording locations associated with the supply grid. As a result, locally distributed, but fundamentally identical, system states are recorded and these fundamentally identical system states recorded at multiple recording locations are those that are also transmitted and hence made available to other subscribers. This thus also means that locally distributed recorders, in particular sensors, are exploited in order to provide a broad database. The locally recorded system states are thus no longer just used locally. The simultaneous transmission means that all of the transmitted states are also comparable.

Furthermore, it is proposed that the recording of at least one of the system states at a respective recording location be performed by a wind turbine and additionally or alternatively by a wind farm. This is based particularly on the idea that there are now many wind turbines and wind farms available. Particularly in countries in which a large expanded network of wind turbines or wind farms is already available, one can therefore also resort to many recorders, particularly sensors at the wind turbines or wind farms. Often, such wind turbines and/or wind farms have sensors for measured values of the same type, such as ambient temperature (e.g., thermometer), wind direction (e.g., anemometer or windsock) and wind speed (e.g., anemometer), voltage based on magnitude (e.g., voltmeter or multimeter), frequency and phase (e.g., oscilloscope) at least at their network connection point, and various sensors that record internal states of the wind turbine or wind farm. Such recorders also do not necessarily have to be sensors, but rather it is also within the bounds of possibility for information to be known from the ongoing control of the relevant wind turbine or the relevant wind farm anyway. By way of example, a central farm control unit regularly has knowledge about the total electric power supplied by the farm. This information does not need to have been measured by the central farm control unit, but rather it can also be calculated from the sum of the individual powers of all wind turbines on the wind farm, for example, these individual powers possibly having been transmitted to the central farm control unit by the wind turbines as information.

It is also proposed that the wind turbine or the wind farm recording a system state at one recording location and the wind turbine or the wind farm recording a system state at another recording location be independent of one another at least such that they supply to the electrical supply grid at different points. It is therefore proposed that these recording locations be distributed more widely than over one wind farm. It is then assumed that each wind farm supplies to the electrical supply grid at a respective network connection point. In other words, this does not just involve collecting data from one wind farm, which could be done by a central farm control unit, for example, but rather it involves proposing that information be collected with an even wider local distribution. The information, namely also the respective fundamentally identical system states, is supposed to be recorded with a local distribution that is at least such that said information concerns at least two network connection points. Preferably, however, it concerns many network connection points. In particular, it concerns at least five, preferably at least 10, network connection points. These system states of the same type that are recorded have a correspondingly wide distribution, and a correspondingly large number of the fundamentally identical system states are also recorded. Preferably, at least two recording locations are at least 50 km apart. This allows a large region to be covered, which is not possible by considering only one wind farm.

The proposed control of the electrical supply grid on the basis of the transmitted system states can therefore access broadly distributed, fundamentally identical system states.

The use of a broad information base of this kind has various advantages, which has been recognized. A broadly distributed information base allows local differences to the recognized. As such, for example, a continuously high voltage can provoke different conclusions and hence different control options than a voltage having various amplitudes, for example, if the voltage at one recording location is particularly high and falls on approaching another recording location. An identical harmonic component for different recording locations can also permit different inferences than harmonic components with different local distributions, for example.

Recorded wind conditions also permit a better picture of a general weather situation as a result of a broad distribution, which means that the thus recorded and transmitted system states collectively are of greater value than each individual value on its own.

According to one embodiment, it is proposed that the fundamentally identical system states be selected from the list comprising
- a voltage of the electrical supply grid,
- a voltage gradient of the voltage of the supply grid,
- a network sensitivity referenced to a network connection point, a reactive power supplied at a network connection point of the electrical supply grid,
- a real power supplied at a network connection point of the electrical supply grid,
- a frequency of a voltage of the supply grid,
- a frequency gradient of a voltage of the supply grid,
- a disturbance in a network section of the electrical supply grid, different recording locations being associated with different network sections,
- harmonics of a voltage of the electrical supply grid,
- harmonics of an electric current supplied to the electrical supply grid,
- weather information, in particular at least one from the list comprising wind direction, wind strength, precipitation information and ambient temperature,
- a rotation speed of a wind turbine.

One possible system state is therefore a voltage of the electrical supply grid. There are therefore locally distributed values of the voltage of the electrical supply grid available, and these can be used to detect the local voltage variation, for example. If necessary, this can be taken as a basis for deriving a supply of reactive power for generating units, for example, to cite just one example.

The fundamentally identical system states can also be a voltage gradient of the voltage of the supply grid. Accordingly, it is proposed that a change in the voltage be used as a system state. The arithmetic sign and speed of the voltage change allow behaviors of the electrical supply grid to be seen. It has therefore been recognized that not only the absolute value of the voltage but also the change in the voltage can be a relevant quantity and that it can be useful to capture these at different locations and distribute them to the individual subscribers, whether directly or via a central evaluation and/or control unit.

A further option proposed is that the fundamentally identical system states are a network sensitivity referenced to a network connection point. Such a network sensitivity describes in particular a voltage change at the considered network connection point with reference to a change in the supplied power. This voltage change is therefore a reaction to the altered supply of power, and this reaction is put into proportion to its cause and forms the network sensitivity. From this, it is particularly possible to recognize whether the network, referenced to this network connection point, is more or less stable, in particular whether it reacts more or less sensitively to changes. Accordingly, a different network sensitivity of this kind can be equalized by means of feedback control. The use of such network sensitivities at different locations allows a comprehensive picture of the electrical supply grid to be derived. In particular, it is possible to recognize whether a specific network sensitivity is a local phenomenon of the respective network connection point, or whether the network or the considered network section has become more or less sensitive as a whole. In this context, the term network is used as a simplification and synonymously with the term electrical supply grid.

It is also proposed that the fundamentally identical system states can be a reactive power supplied at a network connection point of the supply grid. As a result of this being considered for multiple locations, in particular multiple network connection points, it is possible to recognize whether a high or lower reactive power component is supplied by and large. From the respective reactive power values supplied at one location, it is also possible to recognize whether a local or cross-location situation is present. The capture of the supplied reactive power can also be an indicator of the voltage level at the respective network connection point. In particular, a local phenomenon then needs to be handled differently than a cross-location phenomenon.

Preferably, it is also possible for multiple instances of the fundamentally identical system states already described or else described below to be recorded and evaluated. By way of example, a voltage of the electrical supply grid and the respective supplied reactive power can be recorded. From each of these, it is then also possible to infer the extent to which the supplied reactive power correlates with the voltage at the relevant network connection point. The same also applies to a voltage change, that is to say the recording of a voltage gradient, the meaning of which can also possibly be assessed differently depending on the supplied reactive power, to cite another example. In particular, it is proposed that the voltage and frequency of the network be recorded and evaluated, in particular evaluated together.

According to one embodiment, it is also proposed that the fundamentally identical system states concern a respective real power supplied at a network connection point of the electrical supply grid. The recording of many such values of the supplied real power, that is to say at many locations, that is to say at many network connection points, can provide an insight into how much real power is supplied overall. Assuming a balanced network, which can be seen from the frequency, for example, this also makes it possible to conclude how much real power is drawn from the electrical supply grid. Locally distributed values, this also being able to concern locally distributed voltage values, also allow local main focuses to be recognized.

Given approximate knowledge of the loads, the information about the real power supplied in locally distributed fashion can also be used to infer how much real power is transmitted via other links, or is consumed close to its generation.

The fundamentally identical system states can also concern the recording of a frequency of a voltage of the supply grid. Particularly the frequency can be used to identify a power balance in the electrical supply grid. If different frequencies are at least briefly detected at different locations, there may be a network oscillation, and recording and detecting this can be important in order to attenuate such network oscillations or possibly tackle the cause thereof.

Additionally or alternatively, a frequency gradient can also be recorded as a fundamentally identical system state. Such a frequency gradient, particularly also in connection with absolute values of the frequency, can be used to detect changes in the power balance in the electrical supply grid. Such a power balance refers to the response of supplied real power to be drawn. Ideally, this ratio is 1, that is to say when as much power is supplied as is drawn. Otherwise, the frequency changes and supporting measures can be initiated if required. When the frequency change, in particular a frequency gradient, is examined, it may be possible for a critical situation to be identified more quickly.

The fundamentally identical network states can also concern a disturbance in a network section of the supply grid, different recording locations being associated with different network sections. It is thus possible to detect disturbances in different network sections. These can possibly be used to derive control steps, the manner in which the individual suppliers are supposed to respond to such a disturbance. It may also be within the bounds of possibility for a network section to be isolated, and to this end it may then be within the bounds of possibility for the individual generators to possibly have to adapt their power quickly, depending on whether they are in the disconnected or remaining network section and provide a supply there.

The fundamentally identical states recorded can also concern harmonics of a voltage of the supply grid. The locally distributed recording of such harmonics also allows causes thereof to be derived, particularly whether there is a high harmonic component in the electrical supply grid generally or whether there are a few causes thereof, be they suppliers or loads.

It is also proposed that the system state recorded be harmonics of an electric current supplied to the electrical supply grid. These can then also be used in each case to derive whether such harmonics are spreading or have even helped to compensate for other harmonics in the electrical supply grid. In principle, an evaluation of the harmonics also permits inference of the type of connected loads and/or generators, that is to say suppliers.

It is also proposed for the system state recorded and distributed between the subscribers to be able to be weather information. Weather information recorded by many subscribers at different locations also allows the identification of a present general weather situation. The individual subscribers, in particular the wind turbines or wind farms, can therefore serve as weather stations. It should be borne in mind that particularly wind turbines and wind farms record specific weather data that are particularly relevant to wind turbines and wind farms. By way of example, wind turbines essentially allow the recording of weather information on substantially open terrain and regularly also at a great height, namely particularly if this weather information is recorded using appropriate sensors on a nacelle of the relevant wind turbines. In other words, it is possible to record exactly the weather data that are also tailored to wind turbines. In particular, such weather data as are needed for forecasting power that can be supplied by wind turbines are recorded.

In particular, weather information can concern a wind direction and/or a wind strength and/or a piece of precipitation information or several pieces of precipitation information and/or an ambient temperature. The wind direction also allows information concerning anticipable wind strength to be derived if, in each case, it is additionally taken into consideration whether or not there are obstacles in the relevant wind direction. Such obstacles can particularly also be other wind turbines on the same wind farm.

The wind strength can be used to make a statement about available wind power. This can be relevant particularly when wind turbines are temporarily operated at reduced power to comply with legal or other requirements, for example. The reason is that it is then not readily possible to derive the actually available power from the supplied power. A wind strength can also provide an indication of possible potential damage, that is to say a risk of damage to wind turbines, however. The reason is that a high wind strength can then also be an indication of an anticipable power reduction, specifically if the wind turbines generate less power in order to protect themselves. Different wind strengths at the different recording locations can also be an indication of gusty conditions or else a drastic change in the weather, however.

Precipitation information, that is to say particularly whether it is raining or snowing, can provide indications of anticipable power changes. As such, when it is raining, for example, the air can be more moist and hence heavier, in principle, which in turn can influence the installation response and hence possibly the real power supplied.

From precipitation information, in particular paired with information about ambient temperatures, it may also be possible to identify particular situations such as anticipable icing.

An ambient temperature can therefore also provide indications of an anticipable power change, to cite just one example.

According to another embodiment, it is proposed that to record the system states there is provision for at least one respective measuring means (i.e., measuring device or sensor) at each recording location. Measuring means are therefore used and, as a result of their being present at each recording location, a broad basis of measured values can be provided. Alternatively, it is also possible for system states to be derived from the installation response of the wind turbine, however. By way of example, a prevailing wind speed can be inferred from rotation speed, blade angle and generated power. This then also allows broadly distributed information pertaining to prevailing wind speeds to be recorded, and a comprehensive picture of the weather can be created that is in turn relevant to the supplied real power and also to the anticipable real power to be supplied. If, for example, it is detected that a high wind speed prevails everywhere in a very large area, then it can be assumed that a high wind speed is also anticipable in the near future at most wind turbines that have taken part in this recording of the system states, and hence an accordingly suppliable power is anticipable and can be taken into account.

It is therefore also possible, quite generally, for the information about the system states to be evaluable by a network operator, which can identify whether or to what extent it can expect wind power and to what extent it needs to adapt thereto with other, particularly conventional, suppliers. In particular, this also enables such a network operator to obtain extensive information about its electrical supply grid. Among other things, this can also include information that it could not record or did not record previously.

Particularly specific information relevant to wind turbines can therefore preferably also be conditioned by the wind turbines or appropriately operating evaluation devices. In other words, it is not necessary for specific wind data to be conveyed to the network operator, for example, but rather it can suffice to ascertain the resultant anticipation values for power suppliable by the wind turbines, to cite just one example. However, it is also within the bounds of possibility, additionally or alternatively, for the actually recorded data as a whole to be made available to the network operator, and said network operator can then itself make an evaluation and is not reliant on the interpretation of other facilities.

The fundamentally identical system states can also each be a rotation speed of a wind turbine. If the rotation speeds of many wind turbines are captured, these can be used to estimate an available rotation energy in the relevant electrical supply grid or at least part of the electrical supply grid. At least some of this stored rotation energy, which can be quite considerable, can be retrieved by the network operator if necessary, as an instantaneous reserve. Said network operator can take this into consideration for strategies for network support by means of an instantaneous reserve of this kind.

Preferably, it is proposed that the measuring means of the recording locations be aligned with one another, in particular synchronized to one another, at a predetermined time. Particularly in the case of electrical values and, in this instance, particularly in the case of instantaneous values, it can be useful to perform such synchronization so that these system states recorded in distributed fashion are actually recorded at precisely the same time. This can prevent a systematic fault from arising owing to a measurement always being taken somewhat later at one location, for example, which fault can result in an incorrect impression and hence an incorrect evaluation.

According to one embodiment, it is proposed that the method be characterized in that a measurement dynamic range of measuring means used for recording the transmitted system states is taken into consideration for said transmitted system states, in particular in that the respective measurement dynamic range of the measuring means used is removed or is converted or transformed to a prescribed measurement dynamic range, so that, after the removal or conversion, fundamentally identical system states recorded using measuring means having a different measurement dynamic range behave as if they have been recorded using measuring means having an identical measurement dynamic range. In particular, the measuring means having an identical measurement dynamic range that is used for fundamentally identical system states is a virtual measuring means having a prescribed measurement dynamic range. This can be important particularly for quantities that need to be recorded quickly, such as for the network voltage, particularly for recording instantaneous values of the network voltage for detecting a network disturbance.

A solution is therefore provided that allows many readily comparable system states to be collected even though different measuring means are used. This also allows the proposed method to be implemented with already existing subscribers. It is thus not absolutely necessary for the measuring means to be exchanged so as then to have identical measuring means everywhere.

Preferably, it is proposed that the system states be transmitted by means of an encrypted transmission and/or a respective transmission via multiple, in particular different, transmission media and/or different transmission protocols and/or to different receivers for separate evaluation.

In particular encrypted transmission of this kind allows distortion of the information to be prevented. The information as such does not necessarily have to be kept secret, but if the control of the electrical supply grid is dependent thereon, it is necessary to ensure that this information has not been distorted. This can also be helped by the transmission via multiple, in particular different, transmission media. The use of multiple, in particular different, transmission media also allows redundancy of the information to be achieved. Should there be a disturbance, or even an interruption, on a transmission path, that is to say one transmission medium, then information can nevertheless arrive via the other transmission medium. Different transmission media can particularly include wholly or partially line-based transmissions, transmissions by radio and/or via satellite. Different line-based transmission media are also within the bounds of possibility, however, such as, for example, via optical fiber, on the one hand, and an electrical transmission, on the other hand.

Different transmission protocols can also ensure such redundancy and/or data integrity. Different transmission protocols can also be used for different transmission media.

Redundancy can likewise be achieved for the transmission to different receivers for separate evaluation. This also concerns data integrity but also fail-safety of the receivers and controllers.

According to another embodiment, it is proposed that the system states be transmitted in encrypted fashion and the transmission be accomplished by using a regularly changing key and, in particular, the key, or a portion thereof, being transmitted firstly by remote transmission and secondly, or for a remaining portion of the key, by a data carrier to the wind turbines or wind farms involved and/or the central evaluation and/or control unit.

To increase security, it is therefore proposed that the encrypted transmission involve a regularly changing key being used. This prevents foreign access, in particular. A high level of security can furthermore be ensured by using different transmission paths for the information, on the one hand, and the key, on the other hand, and transmitting portions of the key separately. The transmission of the key or of a portion thereof by a data carrier can also take place on a quarterly basis, for example, and such a transmission can be performed by service personnel, for example. Preferably, such transmissions of keys for the encryption are adapted to maintenance intervals of the wind turbine, so that service personnel do not need to travel to the relevant installation just to bring the key. In the case of a wind farm, it can be assumed that regular maintenance, for example, every half a year, of a wind turbine on the farm results in service employees visiting the wind farm much more frequently than every half a year and then being able to exchange a key. It is also within the bounds of possibility for the key to be transmitted occasionally by data carrier and occasionally otherwise. Preferably, a central control unit can generate a key and send it to the subscribers.

According to one embodiment, it is proposed that recorded system states be evaluated before the transmission. This can firstly include recording a voltage signal, extracting its behaviors, such as a voltage gradient, a frequency or a frequency gradient, and transmitting them as a value. Normalization can also be included therein if, for example, the voltage level is referenced to a network rated voltage.

A further advantageous variant of such an evaluation is to capture wind data and to evaluate them in respect of available power and possibly also anticipable power. Such an evaluation, if performed for a wind farm, can also consider constraints of the wind farm, for example. If, for example, the wind farm is oversized such that all wind turbines together could generate more power, given sufficient wind, than the network connection point can cope with, this maximum value can be taken into consideration as well. It is also possible to also take into consideration whether, for example, a wind turbine on the wind farm has failed and therefore, although sufficient wind is available, the failure of the installation means that the wind farm can generate less power overall, to cite another example.

Even in the case of a single wind turbine, it is possible to examine whether it is limited to a specific power on account of constraints, for example, such as, for example, on account of legal requirements.

A further opportunity for an evaluation involves capturing a rotation speed of a wind turbine and, instead of the rotation speed value, calculating a derived quantity such as an instantaneous reserve available on the basis of the rotation energy and then transmitting this instantaneous reserve as a value.

According to another embodiment, it is proposed that the system state captured each time be a three-phase voltage and the capture be effected such that

- a voltage value, in particular a phase voltage, is initially measured for each phase at a first measurement time and
- the three voltage values thus captured are together transformed into polar coordinates having a magnitude and a phase, so that this one magnitude with this one phase represents all three voltage values, and
- such measurement and transformation are performed for multiple recording locations and
- these values are transmitted in polar coordinates as a common value to the central evaluation and/or control unit or between other subscribers and
- the measuring, transforming and transmitting are repeated successively or
- a further evaluation of the measured values transformed into polar coordinates takes place at each recording location and a result of the evaluation is transmitted to the central evaluation and/or control unit or between other subscribers.

The particular effect achieved by this three-phase measurement and transformation into polar coordinates is that all three phases are captured, nevertheless only one data record that is as small as possible needs to be transmitted. In particular, it is proposed that these values be transmitted in polar coordinates as a common value to the central evaluation and/or control unit or be transmitted between the subscribers, and the measuring, transforming and transmitting be repeated successively. Thus, each measurement involves said measurement being transmitted in polar coordinates. Alternatively, an evaluation at each recording location and an evaluation of the measured values transformed into polar coordinates take place, so that first a result of the evaluation is transmitted to the central evaluation and/or control unit or between other subscribers. This means that it is also within the bounds of possibility for a transmission as a measurement to take place much more rarely, this also being able to be dependent on the detected speed of change of the recorded voltage. In particular, such pre-evaluation can be useful if a voltage change rather than the absolute voltage amplitude measured therefor is particularly important.

According to one embodiment, it is proposed that the system states be transmitted in synchronized fashion. The recorded system states are therefore basically transmitted by all subscribers at the same time. Particularly in the case of time-critical information, this information is firstly available simultaneously and secondly also available completely at one evaluation time in each case. According to one embodiment, it is proposed that the central evaluation and/or control unit transmit back data to the wind turbines and/or wind farms on the basis of the system states transmitted to it. The central evaluation and/or control unit therefore serves as a central receiver and simultaneously serves to distribute the received data again. This results in a centralized data transmission structure. However, it is preferably proposed that the evaluation and/or control unit does not distribute all data again, but rather distributes data depending on the respective system states. In particular, information about the electrical supply grid may be of interest to all wind turbines or wind farms, whereas, for example, the rotation speed of wind turbines may be of less significance to the other wind turbines, to cite just one example.

According to another refinement, it is proposed that system states from recording locations of isolated subnetworks that need to be resynchronized for the purpose of reconnection be recorded and transmitted to the central evaluation and/or control unit in order to prepare for the resynchronization and reconnection. Particularly when resynchronizing subnetworks that were isolated particularly in the event of a fault, it can be important to have accurate information about these two subnetworks for the purpose of and before the resynchronization. Identical frequency and phase and voltage amplitude, in particular, are important values. Stabilization of these values, that is to say frequency and voltage amplitude, is also really important, and this can be detected and provided by such subscribers that record such system states, particularly by wind turbines or wind farms. For this, it may in particular also be important what the present wind conditions are like and particularly whether wind turbines can make a significant contribution to supporting the thus freshly resynchronized network and after the resynchronization.

By way of example, it is within the bounds of possibility for at least one of the subnetworks to have few loads prior to resynchronization because said loads were isolated or shut down after the disturbance that caused the isolation of the subnetworks. In this instance, it is also within the bounds of possibility for the supplying wind turbines accordingly only to supply little power because they were restricted on account of the fault. It is now important to know the level of power to which the wind turbines can increase their supply after resynchronization. Depending on that, disconnected loads can then be reconnected in the course of or after resynchronization. In this instance, it has particularly been recognized that wind turbines, if sufficient wind is available, are very fast feedback control units in the electrical supply grid. Wind turbines can significantly increase or decrease their power within a few seconds and are therefore very well suited to controlling such critical states as the aforementioned resynchronization.

Preferably, it is proposed that the controlling of the electrical supply grid on the basis of the transmitted system states comprises at least one control measure from the list consisting of the control measures:

controlling a resynchronization of two network sections of the electrical supply grid, prescribing setpoint values for real and/or reactive power to be supplied, and prescribing control characteristics to be observed.

One possible control measure is therefore the controlling of a synchronization of two network sections of the electrical supply grid as already described. This can particularly involve a network operator resorting to the many collected and coordinately compiled system states and taking this as a basis for controlling the resynchronization. The primary concern in this case is naturally the reconnection of these two subnetwork sections, but it also concerns accompanying measures such as running up power that is to be supplied when yet further loads are connected after resynchronization.

The prescribing of setpoint values for real and/or reactive powers that are to be supplied can also readily be controlled on the basis of the collected system states. Particularly the real power to be supplied regularly concerns the whole network or the relevant network section, because all of the power supplied is supposed to correspond to the consumed power as far as possible. It is also possible in this instance to take into consideration overall changes that are anticipable on the basis of the collected system states.

Support through the supply of reactive power can advantageously also be controlled centrally, or controlled on the basis of the many collected system states, however. In particular, this also allows oscillations to be avoided, for example, which could arise, for example, when a reactive power is supplied, on the basis of voltage, at one point and leads at another point to a voltage increase that could lead to a decrease in the supplied reactive power at that point, this in turn influencing the first supplied reactive power or the voltage detected there. If this is now coordinated by virtue of the necessary system states and hence the necessary information being available to all from all locations, particularly the two cited by way of example, then counteractive operation of this kind can be avoided.

In particular, according to one embodiment, control characteristics can also be prescribed on the basis of the system states. Such control characteristics can concern a frequency-dependent supply of power, for example. Such control characteristics can be stored on wind turbines, and the wind turbines then operate independently on the basis of this control characteristic, that is to say change their supply of real power on the basis of the respective voltage value captured by them, to remain with this example.

From the many collected system states, the result may now be that the network can be assumed to have weakened stability, for example. As support, it would then be useful to have more support power available, that is to say potential power that is not supplied but can be supplied immediately on demand, that is to say particularly within a few seconds. In this exemplary case, it may then be appropriate for the wind turbines to be provided with or select a reduced power characteristic that forces them to supply less power than they could on the basis of the prevailing wind speed. In this instance, the aforementioned frequency-dependent power characteristic is thus reduced such that the wind turbine already supplies a reduced power despite the rated frequency. As the frequency falls further, this means that is possible for this frequency-dependent power characteristic to prescribe a higher power, however, which would not be possible if the wind turbine were already to supply its maximum possible power at the rated frequency. Such a change of characteristic can thus be based on the recorded system states, which provide a picture of the electrical supply grid or a portion thereof.

According to the disclosure, a supply arrangement is also proposed. This comprises multiple wind turbines, wherein the wind turbines or wind farms have measuring means for recording system states of the electrical supply grid and/or system states influencing the electrical supply grid, wherein fundamentally identical system states are simultaneously recorded each time at multiple recording locations associated with the supply grid, the recording of at least one of the system states at a respective recording location is performed by one of the wind turbines and/or one of the wind farms and the wind turbine or the wind farm recording a system state at one recording location is independent of the wind turbine or the wind farm recording a system state at another recording location at least such that they supply to the electrical supply grid at different points, and there is provision for transmission means in order to transmit the recorded system states between the wind turbines and/or wind farms or to transmit said recorded system states from the wind turbines or wind farms to a central evaluation and/or control unit and the wind turbines or wind farms each have control means in order to supply electric power to the electrical supply grid on the basis of the system states transmitted between the wind turbines, or on the basis of the system states transmitted to the central evaluation and/or control unit.

There is thus provision for multiple wind turbines, and these wind turbines have measuring means. The measuring means can be used to record system states of the electrical supply grid, or system states influencing the electrical supply grid. Particularly system states that have already been explained above in connection with the method are within the bounds of possibility in this instance.

For this supply arrangement too, it is proposed that fundamentally identical system states be simultaneously recorded each time at multiple recording locations associated with the supply grid, so that locally distributed recording of multiple fundamentally identical system states is proposed in this case too, the recording being performed at a respective recording location by a respective wind turbine and/or wind farm. The possibilities of such a wind turbine or such a wind farm that has the applicable sensors are exhausted too in this instance and used for control. Recording distributed at least to the extent that the wind turbines or wind farms recording the measured values supply to the electrical supply grid at different network connection points and hence are arranged at an applicable distance from one another is proposed in this case too.

Therefore, the claimed supply arrangement also concerns multiple appropriately widely distributed wind turbines or multiple appropriately widely distributed wind farms.

In order to transmit the recorded system states between the wind turbines or to transmit them from the wind turbines to a central evaluation and/or control unit, there is provision for appropriate transmission means. Such transmission means can be radio transmitters and receivers, for example, or such transmitters and receivers can also operate in wired fashion.

Additionally, each wind turbine has a control means so as thus to supply electric power to the electrical supply grid on the basis of the system states transmitted between the wind turbines or on the basis of the system states transferred to the central evaluation and/or control unit. Such control means can thus take into consideration the thus transmitted system states and perform control on the basis thereof. By way of example, these control means can control a frequency-dependent supply of power and base this on frequency values that they have received as recorded system states by means of said transmission of the system states, to cite just one example.

Preferably, the supply arrangement is prepared to carry out a method according to at least one of the embodiments described above or below. This can mean in particular that appropriate software is implemented. Particularly software in the transmission means and/or the control means or for controlling the transmission means or the control means. Such software would not necessarily have to be implemented in a control means, for example, in order to control the control means. By way of example, the software can be installed in a central computer of the respective wind turbine, in order to control the relevant control means from there. In so far as public means or other apparatuses are obtained from an embodiment of a described method, these accordingly form part of the supply arrangement.

A wind turbine is also proposed that is configured to generate electric power from wind and supply the generated electric power to an electrical supply grid. The supply in this instance takes place at a first network connection point. The proposed wind turbine comprises at least one measuring means for recording system states of the electrical supply grid and/or system states influencing the electrical supply grid, at least one transmission means in order to transmit the recorded system states to further wind turbines and to receive recorded system states from the further wind turbines, or in order to transmit the recorded system states to a central evaluation and/or control unit and to receive system states recorded by the further wind turbines from the evaluation and/or control unit, at least one control means in order to supply electric power to the electrical supply grid on the basis of the received system states, wherein the transmission means is prepared to produce transmission or reception to or from a further wind turbine that supplies to the electrical supply grid at a further network connection point, which is different than the first network connection point.

Such a wind turbine therefore records system states, particularly system states as described above or below in accordance with at least one embodiment. These system states, at least one of them, are transmitted to other wind turbines, and the system states can also be received from these other wind turbines. This can also be effected by means of a central evaluation and/or control unit. This at least one further wind turbine, with which system states are therefore exchanged, is at least at such a distance from the wind turbine under consideration that it supplies to a different network connection point than the wind turbine under consideration. Hence, not only is a local minimum distance proposed that is obtained as a result of the different network connection points, this also applying to corresponding embodiments above, but this also particularly means that electrical system states of the electrical supply grid are recorded at different locations. Such a wind turbine is therefore extended such that it can also take into consideration system states recorded further away and can therefore also adapt to a network situation by and large.

Preferably, the wind turbine is prepared to be used in a method according to one of the embodiments described above or below. In particular, this means that applicable method steps or method actions are implemented particularly as software in the wind turbine, in particular in its transmission and/or control means.

Additionally or alternatively, it is prepared to be used in at least one supply arrangement according to at least one embodiment described above or below. In particular, it is proposed that such a supply arrangement contain and use a proposed wind turbine. The wind turbine has the appropriate interfaces in order to be incorporated into this supply arrangement. This particularly concerns the at least one transmission means of the wind turbine, which is matched to the transmission means of the other wind turbines or central evaluation and/or control unit.

According to the disclosure, a wind farm is also proposed that is prepared for generating electric power from wind and for supplying the generated electric power to an electrical supply grid. For the wind farm too, it is proposed that the supply to the electrical supply grid take place at a first network connection point. This wind farm comprises at least one measuring means for recording system states of the electrical supply grid and/or system states influencing the electrical supply grid, at least one transmission means in order to transmit the recorded system states to further wind farms and to receive recorded system states from the further wind farms, or in order to transmit the recorded system states to a central evaluation and/or control unit and to receive system states recorded by the further wind farms from the evaluation and/or control unit, at least one control means in order to supply electric power to the electrical supply grid on the basis of the received system states, wherein the transmission means is prepared to produce transmission or reception to or from a further wind farm that supplies to the electrical supply grid at a further network connection point, which is different than the first network connection point.

In essence, this wind farm operates as has also been described in connection with a wind turbine above or below. This wind farm is therefore prepared to exchange system states with other wind farms, these other wind farms not supplying to the same network connection point.

Fundamentally, it is also within the bounds of possibility for a hybrid form between wind turbines and wind farms to arise, that is to say for both wind turbines on the one hand and wind farms on the other hand to record system states and exchange them with one another, that is to say exchange them between wind turbine and wind farm. Fundamentally, it is also within the bounds of possibility for a wind turbine to be part of a wind farm.

Preferably, the wind farm is prepared to be used in a method according to an embodiment described above or below. Additionally or alternatively, it is proposed that it is prepared to be used in a supply arrangement according to an embodiment described above or below.

BRIEF DESCRIPTION OF THE SEVERAL VIEWS OF THE DRAWINGS

The invention is explained in more detail below on the basis of embodiments by way of example with reference to the accompanying figures.

DETAILED DESCRIPTION

Figure 1:
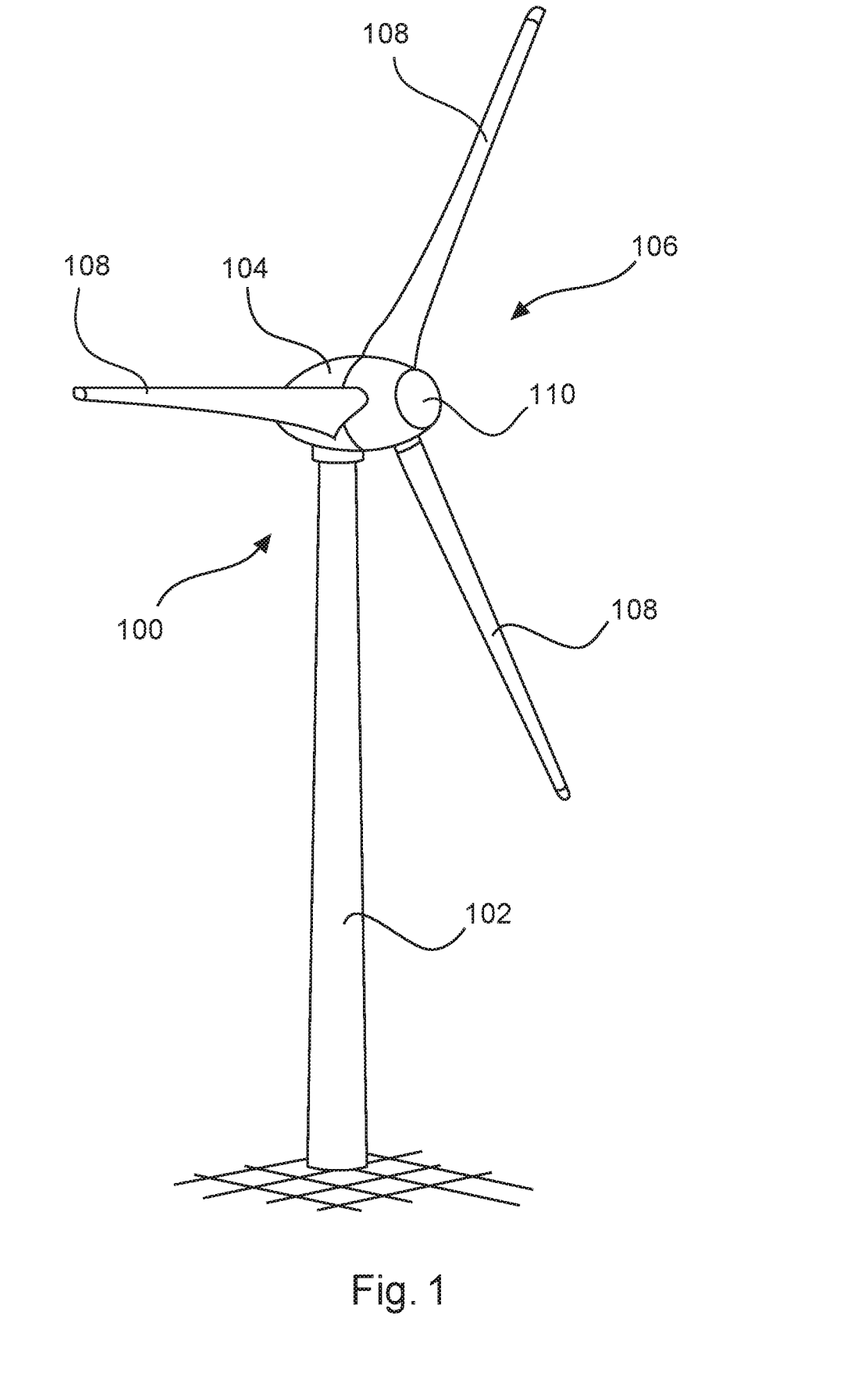
FIG. 1 shows a perspective depiction of a wind turbine.

FIG. 1 shows a wind turbine 100 having a tower 102 and a nacelle 104. The nacelle 104 has a rotor 106 arranged on it having three rotor blades 108 and a spinner 110. The rotor 106 is set in a rotary motion by the wind during operation and thereby drives a generator in the nacelle 104.

Figure 2:
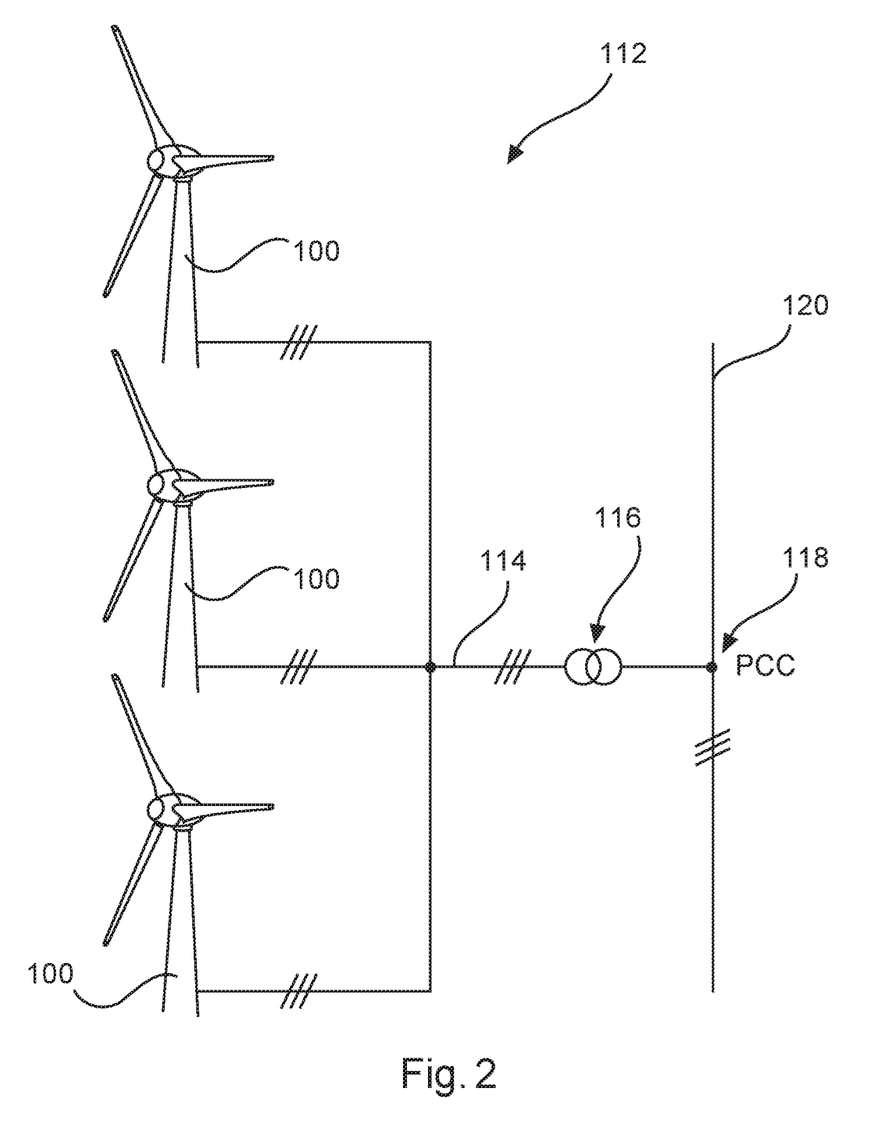
FIG. 2 shows a schematic depiction of a wind farm.

FIG. 2 shows a wind farm 112 having, by way of example, three wind turbines 100, which can be identical or different. The three wind turbines 100 are therefore representative of basically an arbitrary number of wind turbines of a wind farm 112. The wind turbines 100 provide their power, namely in particular the generated current, via an electrical farm network 114. The respectively generated currents and powers of the individual wind turbines 100 are added up and there is usually provision for a transformer 116 that steps up the voltage on the farm so as then to supply to the supply grid 120 at the supply point 118, also referred to generally as a PCC. FIG. 2 is only a simplified depiction of a wind farm 112 that does not show a controller, for example, even though a controller is naturally present. It is also possible for the farm network 114 to be of different design, for example, by virtue of there also being a transformer at the output of each wind turbine 100, for example, to cite just one other exemplary embodiment.

Figure 3:
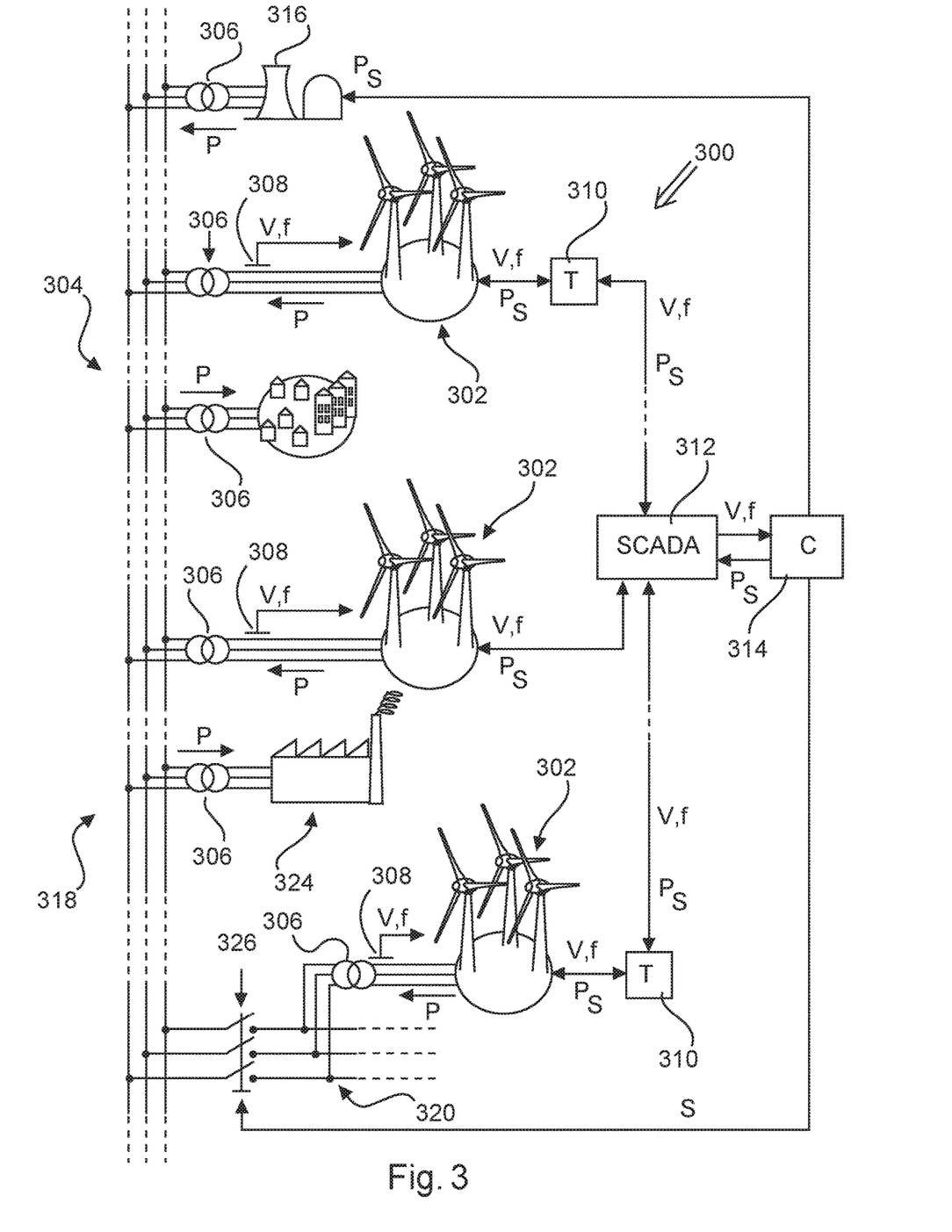
FIG. 3 schematically shows a supply arrangement together with an electrical supply grid.

FIG. 3 shows a supply arrangement 300, which in this instance essentially has the three schematically depicted wind farms 302, the three wind farms 302 also being representative of other wind farms and/or also being representative of other wind turbines. Wind farms and wind turbines can therefore also be referred to as subscribers in the supply arrangement 300. Purely as a precaution, it is pointed out that wind farms naturally do not just have to consist of three wind turbines but rather usually consist of significantly more than three wind turbines.

At any rate, each wind farm 302 supplies power P to an electrical supply grid 304. The electrical supply grid 304, which can also be referred to just as a supply grid or network to simplify matters, is represented substantially symbolically in this case by three lines, which are therefore supposed to symbolize a three-phase system. In particular, the three-phase depiction in FIG. 3 also symbolizes that power is transmitted or at least can be transmitted, whereas single lines in FIG. 3 each represent transmission paths for information, that is to say for data. The electrical supply grid 304 is moreover depicted only in dashes at some points, and this is supposed to symbolize that there can be long distances to the next section at each of those points, and the dashed lines symbolize that the electrical supply grid 304 continues at that point.

Each wind farm 302 now supplies power P to the electrical supply grid 304 via a transformer 306. All of the transformers in FIG. 3 bear the reference sign 306, even though they can have different embodiments. In particular, they can have not only different design variants but also different transformer ratios. Since details of the transformer are unimportant here, the reference sign 306 is always used for the sake of simplicity. The power P shown—the same applies to other electrical quantities depicted in FIG. 3—can also assume different values in each case.

Each wind farm 302 also has a measurement sensor 308 that is used to record a voltage V and a frequency f each time. In this case too, it holds that the measurement sensor 308 and also the values captured thereby do not have to be identical. Particularly the recording of the voltage V can also denote the recording of the amplitude of the voltage as an rms value, but it can also be representative of the recording of other details of the voltage, in particular the voltage profile. It is also possible for instantaneous values to be recorded. The values V and f captured in this manner are then delivered to a transmitting unit 310 (transmitter 310) in order to transmit the recorded values V and f to a central evaluation unit 312 (central wind farms controller 312). The transmitting unit 310 forms a transmission means. There is no provision for a transmitting unit 310 for the wind farm 302 depicted in the middle in FIG. 3, and this is intended to illustrate that a data transmission to the central evaluation unit 312 can also take place in a different manner. Particularly if the wind farm is arranged close to the central evaluation unit 312, a transmission may be in a simple form. A line connecting the wind farm 302 and the central evaluation unit 312 can also be regarded as a transmission means, however. The transmitting unit 310 and also other transmission means can also be regarded as part of the supply arrangement 300. The same applies to the central evaluation unit 312.

The central evaluation unit 312 transmits the values for V and f thus collected from the wind farms 302 to a network operator, which in this instance can be regarded as a central control unit 314 (central controller 314). The transmission of the voltage V and the frequency f from the central evaluation unit 312 to the central control unit 314 can form a respective evaluated value for the voltage V and the frequency f, for example, which is formed from all transmitted voltages V and frequencies fin each case. Preferably, however, this transmission of the voltage V and of the frequency f from the central evaluation unit 312 to the central control unit 314 should be understood to mean that data records are transmitted thereto, so that the network operator receives the voltage and frequency values of all wind farms 302 in its central control unit 314. For the illustrative example in FIG. 3, this would mean that the network operator receives the voltage values V and three frequency values fin its central control unit 314 in each case, particularly for each time. In this case, the central evaluation unit 312 has essentially only bundled these values and prepared them for transmission to the central control unit 314. This structure allows an existing transmission network to be exploited for wind turbines, so that, for example, what is known as a SCADA system can be used, which produces communication to many wind turbines and wind farms. It is then only necessary to produce communication to the central control unit 314, that is to say to the network operator. It should be borne in mind that the central control unit 314 and the central evaluation unit 312 do not necessarily have to be arranged very close to one another. In FIG. 3, these two units 312 and 314 are depicted adjacently just for the sake of clarity.

The three wind farms 302 shown by way of example therefore record system states, in this instance for the electrical supply grid, and transmit them to the central evaluation unit 312, which also provides them to the central control unit 314. As a result, these two central units 312 and 314 can easily obtain an overview of these network-relevant parameters. On the basis of this, controls for the electrical supply grid can be adapted or triggered.

Control options of this kind are also depicted, at least indicated, by way of example in FIG. 3. A variant is that the network operator uses the central control unit 314, on the basis of the system states obtained, in this case the voltage V and the frequency f, to transfer a power setpoint value Ps to the central evaluation unit 312. This can be an overall setpoint value for the relevant wind farms that these are supposed to supply cumulatively. It can alternatively be a percentage power value that can relate to the rated power of each wind farm 302 each time, or that can relate to the power currently supplied by the respective wind farm 302. To this end, the central control unit 314 can deliver such a power setpoint value $P_S$ to the central evaluation unit 312, which in turn can distribute this value to the individual wind farms 302. If the prescribed setpoint power value $P_S$ is a percentage value, it is within the bounds of possibility for the central evaluation unit 312 to simply transfer this value just to the wind farms 302, this possibly involving the transmitting unit 310 being used, which in this case then also serves as a receiving unit (receiver).

If the central control unit 314 transfers an absolute value of a setpoint power $P_S$, however, then the central evaluation unit 312 can distribute this power value to the wind farms 302 appropriately. In this case too, it therefore again holds that the setpoint power value Ps is also supposed to show what kind of quantity is being conveyed, but not what exact value it has. In other words, the setpoint power values Ps shown can have different values.

Each wind farm 302 then converts this setpoint power $P_S$ as appropriate and supplies an appropriate amount of real power P to the electrical supply grid 304 via the respective transformer 306.

Additionally or alternatively, the network operator can also transfer a power setpoint value $P_S$ to a symbolically depicted conventional power station 316. In this case too, the same variable has been used for this power setpoint value, namely $P_S$, without this being supposed to provide an indication of the actually transmitted quantity. In fact, it should also be borne in mind that the transfer of a power setpoint value $P_S$ to a wind farm 302 fundamentally means that this wind farm also immediately converts this setpoint power, that is to say within a few seconds. The transmission of a power setpoint value $P_S$ to a conventional power station 316 can also be an objective for a power setpoint value for a much longer time horizon, for example, for a few seconds.

The fact that conventional power stations usually implement feedback control much more slowly than wind turbines or wind farms can fundamentally become a problem when a conventional power station 316 of this kind is supposed to react to power changes. Conventionally, such a problem has been solved by virtue of an electrical supply grid 304 having a few fundamentally expensive but comparatively quickly controlling generators, in particular gas-fired power stations. Fast feedback control is also possible with hydroelectric power stations, the overall capacity of which is frequently also dependent on the topology of the country, however, and is comparatively low in Germany, for example. The proposed solution now enables the network operator, in this case substantially represented by the central control unit 314, to implement much better forward planning. In particular, all participating wind farms 302 present themselves to the network operator as one large power source that fluctuates comparatively little, or fluctuates slowly, in comparison with individual wind turbines. The network operator can therefore afford to have fewer such fast and expensive feedback control power stations. Instead, it can also use wind turbines and windfarms for feedback control.

FIG. 3 also indicates another control option that can advantageously resort to the many captured system states that the wind farms 302 provide in this case. Specifically, FIG. 3 indicates a first subnetwork 318 and a second subnetwork 320. The first subnetwork 318 is essentially the three-phase line shown on the left in FIG. 3, wherein loads such as the symbolically indicated city 322 and the likewise indicated factory 324 are also able to belong to the respective subnetwork, and also the representatively depicted conventional power station 316 and the connected wind farms 302.

The second subnetwork 320 is essentially just the subnetwork connected to the lower wind farm 302. This second subnetwork 320 is coupled to the first subnetwork 318 via a switching device 326. FIG. 3 shows the switching device 326 in the open state for the purposes of illustration. In the situation shown in FIG. 3, the two subnetworks 318 and 320 are thus isolated from one another. Nevertheless, all the wind farms 302 shown can convey their data, namely the recorded system states, to the central evaluation unit 312.

The switching device 326 can likewise be actuated by the network operator, namely the central control unit 314. The network operator can now take the collected data, that is to say the recorded system states of the voltage V and the frequency f, as a basis for better assessing when is a good moment to close the switching device 326 again in order to reconnect the two subnetworks 318 and 320.

It is therefore proposed that wind turbines and/or wind farms be used as sensors for the purpose of control and feedback control of networks. A network operator can use the data in this instance. The measurements can also be provided as a service. High-resolution measured values can also be provided, if necessary also for post-processing.

Existing SCADA systems can be used. These can provide superordinate information from the networks and to the networks. As a result of more accurate control achievable thereby, it is also possible to manage to reduce network expansion.

One proposal is therefore for wind turbines to be used over a wide area, that is to say, for example, for regions, possibly even for an entire electrical supply grid, as sensors providing network-relevant measured values. This is based on the idea that many wind turbines with really good coverage are available, at least in some regional areas, and these installations have sensors and record relevant measured values anyway, and these installations also communicate "with the outside world" anyway or at least for the most part. It is then thus easily possible to provide a range of information covering a wide area.

Such measured values provided over a wide area can firstly be used to control the networks, and secondly, or as a consequence, it may also be possible to manage to reduce network expansion to what is absolutely necessary. In other words, such a sensor network covering a wide area can help to avoid or at least reduce overexpansion and overcapacities, that is to say oversizing, for security.

Besides directly network-relevant quantities, it is also possible for quantities from a wind measurement to be recorded and transmitted. Forecasts for anticipable powers can also be derived from wind measurement. Data collection from other areas can also be accomplished. Similarly, information about an existing or anticipable storm can be taken into consideration, including a local distribution of the storm.

The data can be transmitted to a central location, and/or directly between wind turbines or wind farms. When transmitted to a central location, the latter can undertake the coordination. When transmitted between wind turbines or wind farms, it is within the bounds of possibility for each subscriber to be able to subscribe to data and then to receive only data to which it has subscribed. This allows central coordination to be dispensed with.

The invention claimed is:

1. A method for assisting control of an electrical supply grid or of a portion thereof, comprising:
    recording system states, wherein the system states are of the electrical supply grid or are influencing the electrical supply grid;
    exchanging the system states between a plurality of wind power systems, wherein the plurality of wind power systems use the system states to control a respective supply of electrical power to the electrical supply grid; and
    controlling the electrical supply grid based on the system states,
    wherein:
        substantially identical system states are simultaneously recorded at multiple recording locations associated with the electrical supply grid;
        a first wind power system of the plurality of wind power systems records a first system state of the system states at a respective recording location of the multiple recording locations;
        a second wind power system of the plurality of wind power systems records a second system state at another recording location of the multiple recording locations; and
        the first wind power system and the second wind power system are independent of each other, and the first wind power system and the second wind power system respectively supply the electrical power to the electrical supply grid at different grid connection points.

2. The method as claimed in claim 1, wherein the substantially identical system states are selected from a list comprising:
    a voltage of the electrical supply grid;
    a voltage gradient of the voltage of the electrical supply grid;
    a network sensitivity referenced to a first network connection point;
    a reactive power supplied at a second network connection point of the electrical supply grid;
    a real power supplied at the second network connection point of the electrical supply grid;
    a frequency of the voltage of the electrical supply grid;
    a frequency gradient of the voltage of the electrical supply grid;
    a disturbance in a network section of the electrical supply grid, wherein different recording locations are associated with different network sections;
    harmonics of the voltage of the electrical supply grid;
    harmonics of an electric current supplied to the electrical supply grid;
    weather information that is at least one of: wind direction, wind strength, precipitation or ambient temperature; and
    wind turbine rotation speed.

3. The method as claimed in claim 1, comprising:
    recording the system states using at least one respective measuring device at each recording location of the multiple recording locations.

4. The method as claimed in claim 3, wherein measuring devices of the multiple recording locations are aligned with each other or synchronized with each other to measure at predetermined times.

5. The method as claimed in claim 1, wherein a measurement dynamic range of a sensor used for recording the system states is evaluated for the system states.

6. The method as claimed in claim 5, wherein the measurement dynamic range of the sensor is removed, converted or transformed to a prescribed measurement dynamic range such that after the removal or conversion, the fundamentally identical system states recorded using sensors having different measurement dynamic ranges behave as if they have been recorded using sensors having substantially identical measurement dynamic ranges.

7. The method as claimed in claim 1, comprising:
transmitting the system states by encrypted transmission, different transmission media, different transmission protocols or to different receivers for separate evaluation.

8. The method as claimed in claim 1, comprising:
transmitting the system states in an encrypted fashion by regularly changing a key.

9. The method as claimed in claim 8, comprising:
transmitting the key or a portion thereof firstly by remote transmission and transmitting a remaining portion of the key by a data carrier to the wind turbines or wind farms or a central wind farms controller or central controller.

10. The method as claimed in claim 1, comprising:
evaluating the recorded system states before transmission.

11. The method as claimed in claim 1, comprising:
capturing the first system state as a three-phase voltage, wherein:
 a voltage value or a phase voltage is initially measured for each phase at a first measurement time,
 three voltage values thus captured are together transformed into polar coordinates having a magnitude and a phase so that the magnitude and the phase represents the three voltage values, and
 measurement and transformation are performed for the multiple recording locations,
transmitting the three voltage values in the polar coordinates as a common value to a central wind farms controller or central controller or between wind power systems of the plurality of wind power systems; and
successively repeating the measuring, transforming and transmitting are repeated successively; or
further evaluating the three voltage values transformed into the polar coordinates at each recording location and transmitting a result of the evaluation to the central wind farms controller or central controller or between wind power systems of the plurality of wind power systems.

12. The method as claimed in claim 1, comprising:
transmitting the system states in synchronized fashion.

13. The method as claimed in claim 1, comprising:
transmitting, by a central wind farms controller or central controller, data to the plurality of wind power systems based on the system states.

14. The method as claimed in claim 1, wherein system states from recording locations of isolated subnetworks are recorded and transmitted to a central wind farms controller or central controller for for resynchronization and reconnection.

15. The method as claimed in claim 1, wherein controlling the electrical supply grid based on the system states includes at least one of control measures including:
 controlling a resynchronization of two network sections of the electrical supply grid;
 prescribing setpoint values for real or reactive power to be supplied; and
 prescribing control characteristics to be observed.

16. The method as claimed in claim 1, wherein a wind power system of the plurality of wind power systems is a wind turbine or a wind farm.

17. A supply arrangement, comprising:
a plurality of wind power systems including respective sensors for recording system states, wherein the system states are of an electrical supply grid or are influencing the electrical supply grid, wherein:
 substantially identical system states are simultaneously recorded at multiple recording locations associated with the electrical supply grid,
 a first wind power system of the plurality of wind power systems records a first system state at a respective recording location,
 a second wind power system of the plurality of wind power systems records a second system state at another recording location,
 the first wind power system is independent of the second wind power system, and and the second power system supply respective electric power to the electrical supply grid at different grid connection points,
 the plurality of wind power systems include respective transmitters and receivers configured to exchange the system states between the plurality of wind power systems or to exchange the system states between the plurality of wind power systems and a central controller, and
 the plurality of wind power systems include respective controllers configured to supply the respective electric power to the electrical supply grid based on the system states exchanged between the plurality of wind power systems or exchanged with the central controller.

18. A wind turbine for generating electric power from wind and for supplying the generated electric power to an electrical supply grid at a first network connection point, comprising:
at least one sensor configured to record system states, wherein the system states are of the electrical supply grid or are influencing the electrical supply grid;
at least one transmitter configured to transmit the system states to further wind turbines and to receive recorded system states from the further wind turbines, or transmit the system states to a central controller;
at least one receiver configured to receive system states recorded by the further wind turbines from the central controller; and
at least one controller configured to supply the electric power to the electrical supply grid based on the received system states, wherein:
 the at least one transmitter is configured to perform transmission to a further wind turbine that supplies the electrical supply grid at a second network connection point different than the first network connection point, and
 the at least one receiver is configured to receive the system states from the further wind turbine.

19. A wind farm for generating electric power from wind and for supplying the generated electric power to an electrical supply grid at a first network connection point, comprising:
at least one sensor configured to record system states, wherein the system states are of the electrical supply grid or are influencing the electrical supply grid;

at least one transmitter configured to transmit the system states to further wind farms or transmit the system states to a central controller;
at least one receiver configured to receive recorded system states from the further wind farms or, receive system states recorded by the further wind farms from the central controller; and
at least one controller configured to supply the electric power to the electrical supply grid based on the received system states, wherein:
  the at least one transmitter is configured to perform transmission to a further wind farm that supplies the electrical supply grid at a second network connection point different than the first network connection point, and
  the at least one receiver is configured to receive the system states from the further wind farm.

* * * * *